No. 868,592. PATENTED OCT. 15, 1907.
C. E. BARRY.
AIR BRAKE SYSTEM.
APPLICATION FILED MAY 14, 1906.
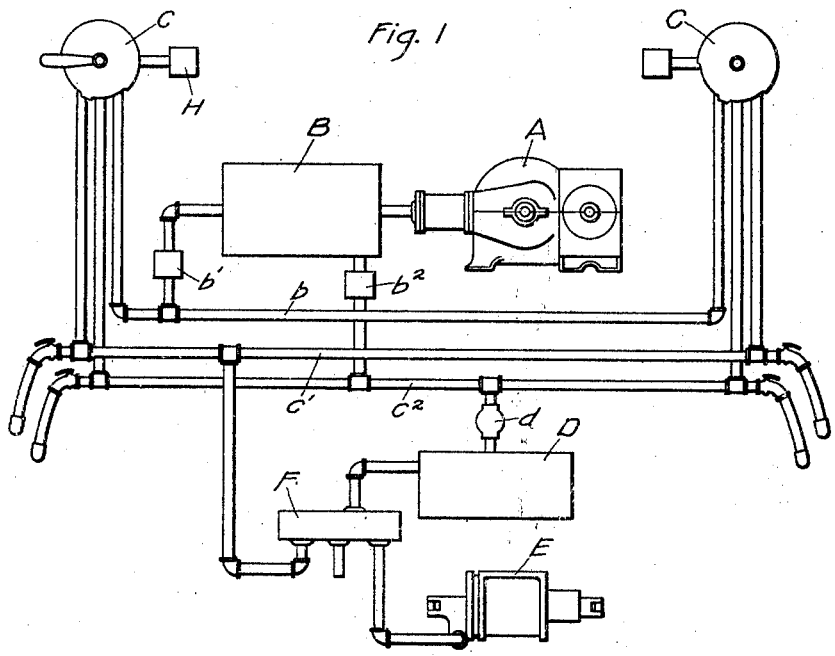
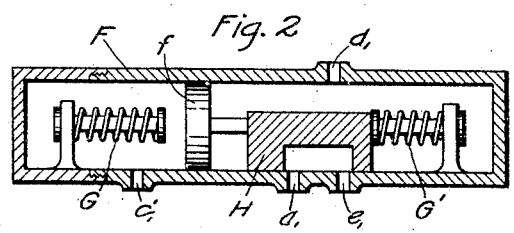
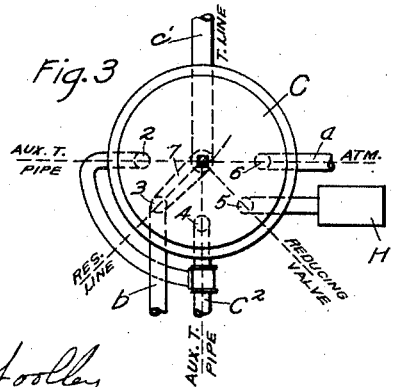
Witnesses:
Inventor,
Charles E. Barry
By Albert G. Davis
Att'y.

UNITED STATES PATENT OFFICE.

CHARLES E. BARRY, OF SCHENECTADY, NEW YORK, ASSIGNOR TO GENERAL ELECTRIC COMPANY, A CORPORATION OF NEW YORK.

AIR-BRAKE SYSTEM.

No. 868,592.  Specification of Letters Patent.  Patented Oct. 15, 1907.

Application filed May 14, 1906. Serial No. 316,721.

*To all whom it may concern:*

Be it known that I, CHARLES E. BARRY, a citizen of the United States, residing at Schenectady, county of Schenectady, State of New York, have invented certain new and useful Improvements in Air-Brake Systems, of which the following is a specification.

My invention relates to air-brakes, and its object is to provide a novel system which, while preserving the advantages of the ordinary automatic system as regards automatic application of the brakes upon a breaking apart of the train, at the same time renders it possible to graduate the release of the brakes, as well as their application, as simply and conveniently as in the ordinary straight-air system, and also maintains the auxiliary reservoirs at all times fully charged so that an unlimited number of applications may be made in rapid succession.

My invention consists in providing two train-pipes, automatic valves on the several cars controlling the flow of air into and out of the brake cylinders, the pistons for operating the valves being exposed on opposite sides to pressures supplied from the two train-pipes, respectively, with means for varying at will the relative pressures in the two train-pipes. In this way perfect control of the brake-controlling valves is secured.

My invention further comprises a number of other features, which will best be understood by reference to the accompanying drawings, in which Figure 1 shows a diagrammatic view of an air-brake system arranged in accordance with my invention; Fig. 2 shows a cross-section of the automatic brake-controlling valve; and Fig. 3 shows a plan view of the engineer's valve.

In the drawings, A represents an air-pump connected to and supplying the main reservoir B, which is connected through a reducing valve $b'$ and a pipe $b$ to the engineer's valves C C. The engineer's valves are connected to two train-pipes $c^1$ and $c^2$, both of which normally carry air under pressure. The pipe $c^2$ is connected directly to reservoir through a pressure reducing valve $b^2$ which is adjusted to give a greater reduction than valve $b'$. For instance, the valve $b^2$ may be adjusted to give a reduced pressure of 70 pounds and the valve $b'$ 75 pounds, so that when pipes $c'$ and $b$ are connected by the engineer's valve, the pressure in pipe $c'$ is five pounds greater than in pipe $c^2$. The train-pipe $c^2$ serves to maintain the auxiliary reservoirs D on the several cars at all times fully charged through the check-valves $d$, which permit the flow of air from train-pipe to auxiliary reservoir, but would prevent a flow in the opposite direction should the train break apart.

E represents a brake-cylinder, which is arranged to be connected to reservoir D or to atmosphere by the automatic controlling valve F. This valve, as shown in Fig. 2, is a plain slide-valve actuated by the piston $f$, and arranged to be reciprocated by the piston between two yielding stops G G', so arranged that the valve engages only one stop at a time. The port $c'_1$ is in connection with train-pipe $c'$ and the port $d_1$ is in communication with the reservoir D, so that the piston $f$ is subjected on its opposite side to the pressures supplied from the two train-pipes. $e_1$ is a port leading to the brake-cylinder, and $a_1$ opens to the atmosphere.

The engineer's valve is arranged as shown in Fig. 3, with the central port 1 in the valve seat connecting with train-pipe $c^1$, and a series of ports 2, 3, 4, 5 and 6 arranged in the valve seat on the arc of a circle. The valve carries a radial port or passage 7, which connects the central port 1 to the other ports.

The operation of the system is as follows: Normally, the engineer's valve is in position for connecting train-pipe $c^1$ to train pipe $c^2$, thereby maintaining the train-line $c'$ charged at the same pressure as pipe $c^2$. The automatic valve F is normally in the position shown in Fig. 2, connecting brake-cylinder to atmosphere. To apply the brakes, the engineer's valve is moved to connect ports 1 and 5, thereby connecting train-pipe $c^1$ to atmosphere through the reducing valve H. This lowers the pressure on the left-hand side of piston $f$, so that valve H is moved over toward the left, compressing spring G and opening port $e_1$. Air is consequently supplied from auxiliary reservoir to brake-cylinder and application of the brakes secured. When it is desired to stop the flow of air to brake-cylinder, the engineer's valve is moved to connect ports 1 and 4. This connects the two train-lines together and raises the pressure in train line $c'$ to 70 pounds, if that is the pressure for which valve $b^2$ is adjusted, thereby equalizing the pressure on opposite sides of piston $f$. Spring G consequently returns the valve to a position somewhat to the left of that shown in Fig. 2, lapping port $e^1$. For a further application of the brakes, engineer's valve is again moved to connect the ports 1 and 5, or if an emergency application is desired, to connect ports 1 and 6, which connects train-pipe $c^1$ directly to atmosphere.

In order to release the brakes, the engineer's valve is moved so as to connect first ports 1 and 3, and then ports 1 and 2. Connecting ports 1 and 3 raises the pressure in train-pipe $c^1$ to 75 pounds by connecting it to reservoir, through reducing valve $b'$, thereby pushing piston $f$ to the right and compressing spring $G^1$ so as to move the valve F past release position into a second lap-position, in which port $a_1$ is closed. But when the engineer's valve reaches the position in which it connects ports 1 and 2, pressure in the two train-pipes is equalized, allowing spring $G^1$ to return valve F to release position, as shown in Fig. 2. To stop the out-flow of air from the brake-cylinder, the engineer's valve is again moved to connect ports 1 and 3. This again raises the pressure in the train-pipe $c^1$ and again moves valve F to its second lap-position. Thus, by successively raising the pressure in the first train-pipe $c^1$ and then equalizing it with the pressure in train-pipe $c^2$ a graduated release may be obtained in as simple a manner as in the ordinary straight-air system. The two lap positions of the automatic valve are provided for the purpose of so arranging the valve that when the brakes are finally released the valves will stand in release position so as to prevent emergency application of the brake when running by leakage of air to the brake cylinder.

What I claim as new and desire to secure by Letters Patent of the United States, is:

1. In an air-brake system, a train-pipe, reservoirs on the several cars, automatic valves controlled by difference in pressure in train-pipe and reservoirs and controlling the flow of air into and out of the brake cylinders, and a manually-operated valve and pipe connections for connecting said train-pipe to atmosphere, to the reservoirs, or to a source of higher pressure.

2. In an air-brake system, a train-pipe, reservoirs on the several cars, automatic valves controlled by difference in pressure in train-pipe and reservoirs and controlling the flow of air into and out of the brake cylinders, a second train pipe connected to said reservoirs through check-valves, and means for connecting the first train-pipe to atmosphere, to a source of pressure, or to the second train-pipe.

3. In an air-brake system, a train pipe, reservoirs on the several cars, automatic valves controlled by difference in pressure in train-pipe and reservoirs and adapted to connect the brake cylinders to said reservoirs or to atmosphere, a second train-pipe connected to said reservoirs through check-valves, and means for connecting the first train-pipe to atmosphere, to a source of pressure, or to the second pipe.

4. In an air-brake system, two train-pipes, valves on the several cars controlling the flow of air into and out of the brake cylinders, pistons for operating said valves exposed on opposite sides to pressures supplied from the two train-pipes respectively, and means for producing at will a relatively greater pressure in either of said train-pipes and for equalizing the pressures in the two train-pipes.

5. In an air-brake system, two train-pipes, valves on the several cars controlling the flow of air into and out of the brake-cylinders, pistons for operating said valves exposed on opposite sides to pressure supplied from the two train pipes respectively, and means for producing at will a relatively greater pressure in either of said two train-pipes.

6. In an air-brake system, a brake-controlling valve, a piston for reciprocating said valve, means for varying the relative pressures on opposite sides of said piston, and yielding stops on opposite sides of said valve so spaced that said valve is in engagement with only one of said stops at a time, said valve being arranged to be in lap-position when in engagement with one stop and in release position when in engagement with the other.

7. In an air-brake system, two yielding stops, a brake-controlling valve adapted to be reciprocated between said stops and arranged to be in lap-position when in engagement with one stop and in release-position when in engagement with the other stop, a piston operatively connected to said valve and adapted to move said valve from lap-position to application-position against the pressure of one of said stops and from release to a second lap-position against the pressure of the other stop, and means under the control of the engineer for varying at will the relative pressures on opposite sides of said piston.

8. In an air-brake system, two yielding stops, a brake-controlling valve adapted to be reciprocated between said stops and arranged to be in lap-position when in engagement with one stop and in release-position when in engagement with the other stop, a piston operatively connected to said valve and adapted to move said valve from lap-position to application-position against the pressure of one of said stops and from release to a second lap-position against the pressure of the other stop, two train-pipes for supplying pressure to opposite sides of said piston, and means for varying at will the pressure in one of said train-pipes and for equalizing the pressures in the two train-pipes.

9. In an air-brake system, two yielding stops, a brake-controlling valve adapted to be reciprocated between said stops and arranged to be in lap-position when in engagement with one stop and in release-position when in engagement with the other stop, a piston operatively connected to said valve and adapted to move said valve from lap-position to application-position against the pressure of one of said stops and from release to a second lap-position against the pressure of the other stop, two train-pipes for supplying pressure to opposite sides of said piston, the connection from one of said pipes to said piston including a check-valve, and means for varying at will the relative pressures in said train-pipes.

10. In an air-brake system, two train-pipes, valves on the several cars controlling the flow of air into and out of the brake cylinders, pistons for operating said valves exposed on opposite sides to pressures supplied from the two train-pipes respectively, a check valve in the supply connection from one of said train pipes, and means for producing at will a relatively greater pressure in either of said two train-pipes.

11. In an air-brake system, two train-pipes, one carrying air at a determined pressure, means for varying the pressure in the other pipe above and below the pressure in the first, and valves on the several cars controlled by the difference in the pressures in said pipes and controlling the flow of air into and out of the brake cylinders.

12. In an air-brake system, two train-pipes, one carrying air at a determined pressure, means for connecting the second train-pipe to a source of higher pressure, to atmosphere or to the first train-pipe and valves on the several cars controlled by the difference in the pressures in said pipes and controlling the flow of air into and out of the brake cylinders.

In witness whereof, I have hereunto set my hand this 12th day of May, 1906.

CHARLES E. BARRY.

Witnesses:
BENJAMIN B. HULL,
HELEN ORFORD.